United States Patent Office 3,369,711
Patented Feb. 20, 1968

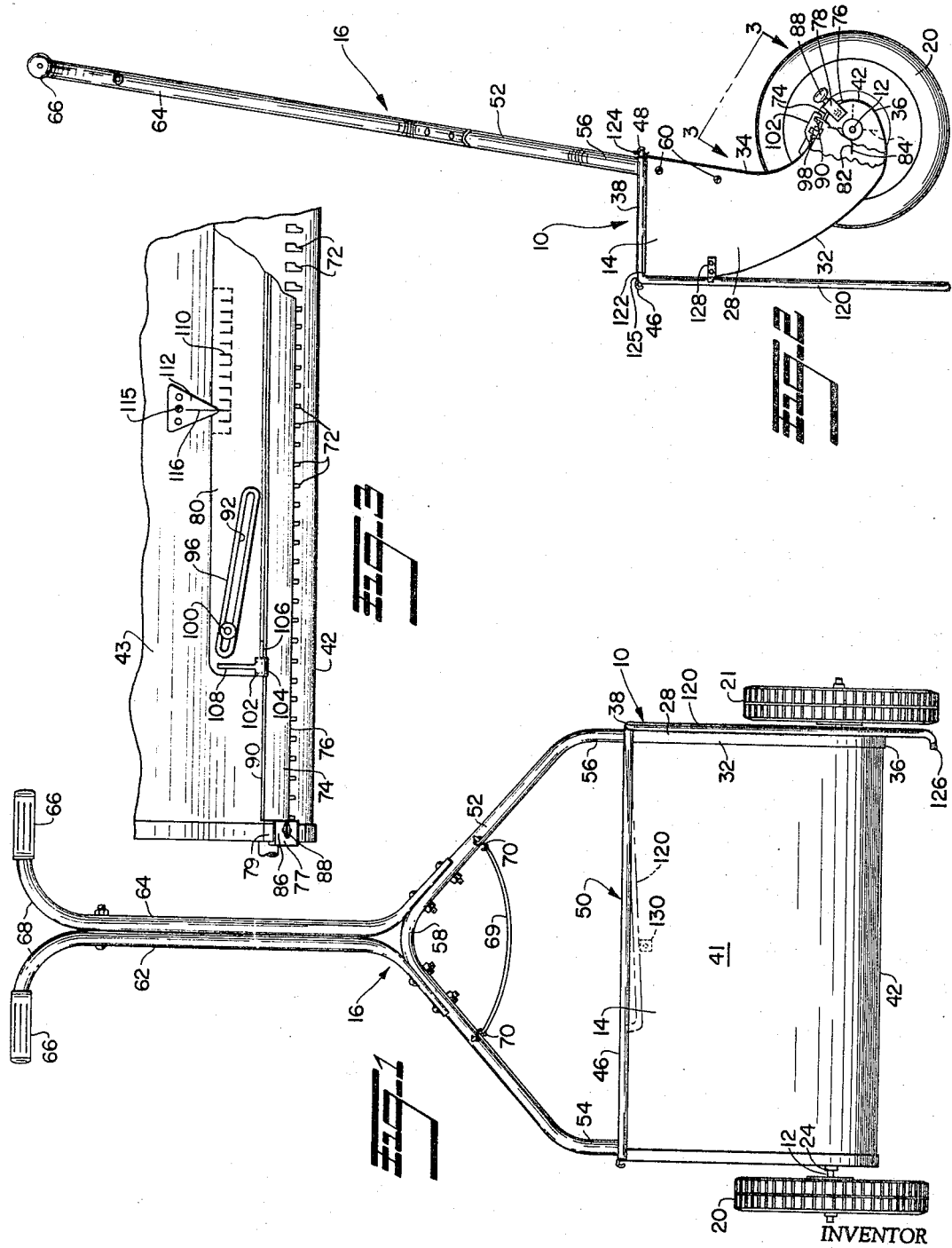

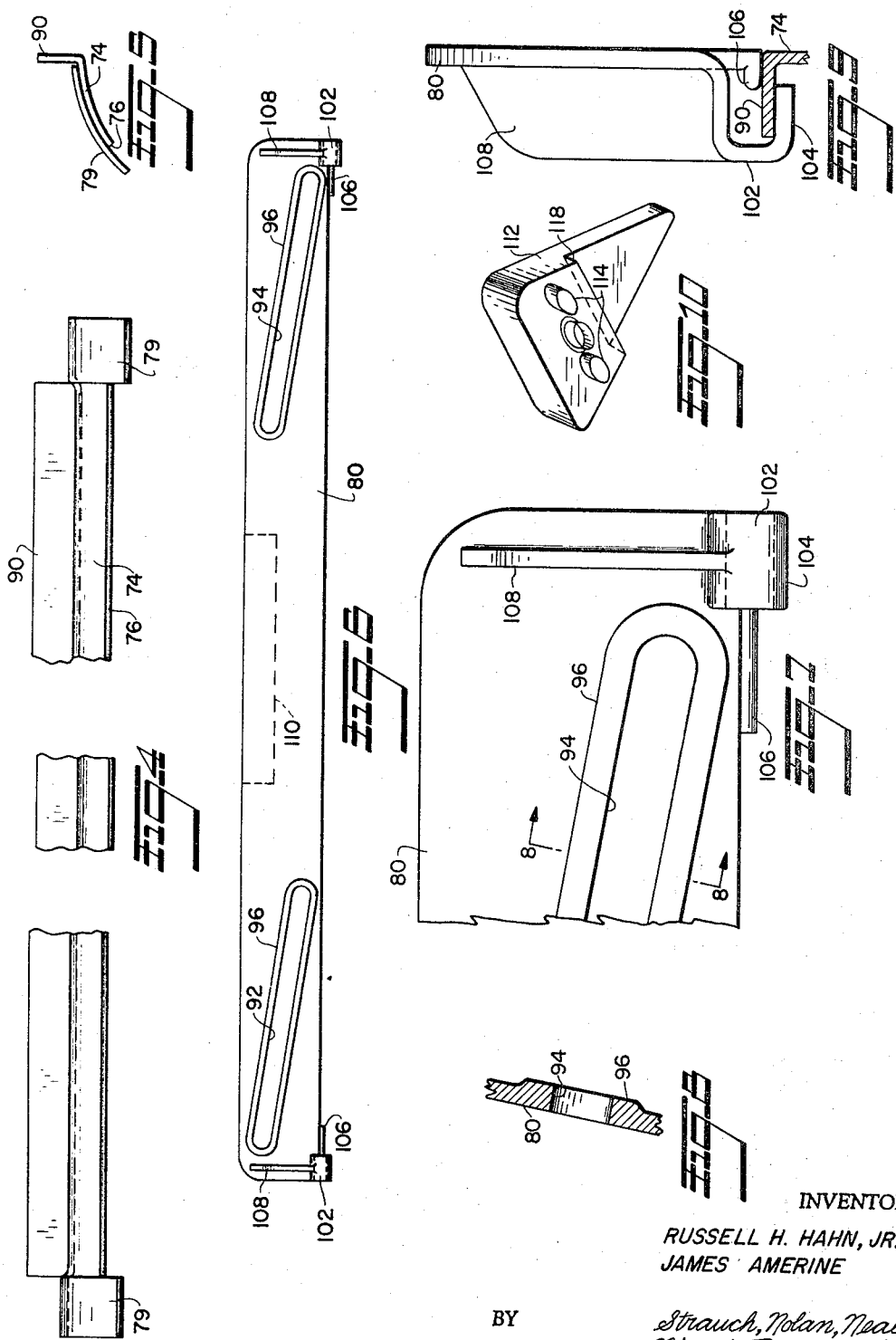

3,369,711
SPREADER RATE CONTROL DEVICE
Russell H. Hahn, Jr., and James Amerine, Marysville, Ohio, assignors to The O. M. Scott & Sons Company, Marysville, Ohio, a corporation of Ohio
Filed Oct. 23, 1965, Ser. No. 503,673
14 Claims. (Cl. 222—177)

ABSTRACT OF THE DISCLOSURE

A material distributing spreader with a wheel supported hopper having discharge openings across a convexly curved bottom wall. A discharge rate control mechanism includes an arcuately shiftable shutter member across the hopper bottom wall and a shiftable, combination indexing and positioning slide mounted on the hopper to accommodate components of lateral shift with concurrent component of shift in the direction of arcuate movement of the shutter, the latter movements being in direct ratio to components of lateral shift of the slide. Spaced apart channel shaped members connect the shiftable slide to the shutter and permit relative transverse movement, while preventing relative movement in the direction of arcuate shift, between the slide and the shutter. Clamp devices at the ends of the shutter releasably maintain both the shutter and the slide in any selected position. The slide is made from a plastic such as "Cycolac."

Background

This invention relates to rate control mechanism on spreaders used for distribution of lawn treatment materials such as seed, fertilizer, herbicides, insecticides and other plant treatment chemicals. This invention was developed in connection with and is disclosed and described in conjunction with an attitude cut-off material spreader disclosed and claimed in a co-pending application Ser. No. 328,012, filed Dec. 4, 1963, now United States Patent No. 3,239,107.

Lawn treatment materials can most effectively be applied to lawn areas by use of spreaders which accurately and uniformly control the quantity of material distributed per unit area of lawn. To enable such spreaders to be used to apply many varieties of lawn treatment materials such as enumerated above, spreaders are normally provided with an indexed adjustable dispensing control mechanism by which the application rate may be selectively set. Shown in many of the prior art United States patents, such rate control mechanism may be a shutter or a closure plate shiftable for adjustment to vary the size of a discharge flow path such as a plurality of apertures located in a lower portion of a spreader material hopper and those previously known spreaders are almost always equipped with mechanism enabling a quick and positive closure of all discharge apertures when material discharge is not desired.

The spreader which is the subject matter of the aforenoted application Ser. No. 328,012 uses a unique principle for cut-off of material distribution which does not require positive closing of the discharge apertures. Instead it utilizes a hopper construction which retains lawn treatment material without spillage or dispensing when the hopper is swung through an arc about the wheel axis to a cut-off atttude. The shape of the hopper and the principle of attitude control is completely disclosed and described in the aforenoted application to which reference may be had for any details necessary to an understanding of the present invention.

Because the referenced type of spreader utilized attitude control to permit distribution and enable cut-off, it therefore was readily capable of utilizing a simple low-cost closure plate which could be manually shifted to various positions to change the rate of distribution as desired. That prior art rate control device was simple and inexpensive but it provided only a limited range of application rates. In the present invention a different rate control mechanism is proposed wherein the formerly, limited range of application rate has been completely changed by making the shutter plate incrementally adjustable throughout a wide range to enable application of all products. The spreader unit upon which the present invention is disclosed uses the same attitude cut-off principle as the spreader in application Ser. No. 328,012, but its rate control mechanism has been made more versatile while still retaining simplicity and low cost of manufacture.

Summary

Accordingly it is a primary object of the present invention to provide a low-cost simplified spreader with a novel highly accurate variable discharge rate mechanism for accurate application of lawn treatment materials.

A further object resides in the provision of novel simplified application rate control mechanism for material distribution spreaders enabling low-cost in the component manufacture of rate control mechanism.

A still further object resides in the provision of a novel material spreader rate control mechanism in which an arcuately shiftable discharge aperture shutter plate or bar is directly connected to a laterally shiftable member which serves as an accurate shutter locating and positioning device as well as a rate index member. It is a still further object in conjunction with the foregoing that both shutter and control member are directly located in closely related disposition on the wall of the spreader hopper. Still another object in conjunction with the foregoing resides in the provision of a novel sliding hinge construction providing the direct connection between the aperture shutter bar and the indexing control member which enables the selective but accurate and positive arcuate location of the discharge shutter depending upon lateral positioning of the indexing control member while permitting the relative lateral shift between the control member and the discharge shutter. The simple positive end clamping of the shutter which serves to maintain shutter and control member selections is also a unique arrangement in spreader rate control mechanisms.

These and other objects of the present invention will become more fully apparent from the following description and appended claims when read in conjunction with the accompanying drawings wherein:

FIGURE 1 is a front view of a spreader which utilizes the present invention;

FIGURE 2 is a side elevation view of FIGURE 1 with the wheel closest to the viewer omitted to show details of the lower portion of the hopper;

FIGURE 3 is a partially broken away detail view to a larger scale than FIGURES 1 and 2 showing the rear discharge side of the spreader and illustrating components of the new rate control mechanism of the present invention;

FIGURE 4 is another view of the rate control bar different from that of FIGURE 3 and more clearly illustrates the stepped end guide portions;

FIGURE 5 is an end view of the rate control bar as shown in FIGURE 4;

FIGURE 6 is a complete plan view of the rate setting slide, a portion of which is seen in FIGURE 3;

FIGURES 7, 8, and 9 are enlarged detail views of parts of the injection molded rate setting slide, FIGURE 8 being a section view taken on line 8—8 of FIGURE 7 and FIG- URE 9 an end view illustrating one of the hinge lug and bearing pad connector units of the rate setting slide; and FIGURE 10 is a perspective view on an enlarged scale showing the underside of the fixed index also illustrated in assembly on the hopper in FIGURE 3.

A spreader combination incorporating the present invention normally includes a rotating agitator adjacent a lateral row of hopper discharge apertures (which could be an elongate lateral slot), and it is necessary that a particular lawn treatment material composed of particles within a specific granular size and flowability range will flow through a predetermined discharge aperture area in the bottom of the hopper at a predetermined rate depending upon the rate of agitation. This controlled discharge flow occurs because gravitational force of material in the hopper maintains the space between the agitator and the discharge apertures full of material so as to enable the force derived from rotation of the agitator to be transmitted to material immediately adjacent the discharge apertures to cause that material to flow from the hopper. By selectively varying the size of the discharge opening, i.e., by providing a laterally extending row of discharge openings with selective discharge opening control, one can accomplish a wide range of rates of application as will be required by various properly formulated herbicides, insecticides, and plant food materials. A simplified low-cost rate control bar, directly interconnected with a rate setting slide member which in turn cooperates with a scale pointer enables accurate controlled and indexed positioned of the rate control bar over the row of apertures to vary the open areas of such apertures. Although the new mechanism can be set to a full closed position it has been developed specifically with the attitude cut-off spreader in mind where the need of a rate control bar or other means to provide full positive cut-off of the discharge openings has been eliminated. Thus, the rate control mechanism can and has been kept simple and the expensive complex adjustment mechanisms normally used on high quality high cost spreaders no longer is necessary. Once the desired discharge rate position is determined, then simple inexpensive screw clamps are used to clamp the bar in the set position. This arrangement is rendered feasible because the control bar need not thereafter be shifted to cut-off position each time the operator desires to stop dispensing material, cut-off being occasioned merely by swinging the hopper through the aforenoted wide angle to accomplish attitude cut-off.

In attending to lawn care the user of a material application spreader depends upon index numbers on his spreader rate mechanism to obtain proper application rates. It is necessary that each spreader assembly be identical with those previously produced and that the components of the rate mechanism also be identical and held to close tolerances so that the final assembled spreader will without fail apply the desired amount of lawn treatment material in response to the index setting made by the user. Very close tolerances of all components of the spreader assembly is an absolute requisite. It is true that such close tolerances will necessitate increased manufacturing costs and will result in a number of manufacturing rejects. Those very problems resulted in unreasonably raising the cost of spreaders far above that which a home owner normally expected to pay and was a primary reason for developing this new type of spreader. The present rate mechanism keeps the number of components to an absolute minimum while still permitting a wide variable range of application rates, and enables ease of manufacturing and maintenance of tolerance limitations in individual components.

As shown generally in FIGURES 1 and 2, a spreader 10, incorporating the present invention, has a wheeled axle 12, a material discharging hopper 14 journalled on axle 12 and an operating handle assembly 16 rigidly connected to the hopper unit 14. Spreader 10 may be used with the hopper filled with material to be dispensed or it may be used in combination with a package or bag of such material, in which case the bag would be positioned resting along the front of handle assembly 16 with its open end down inside the hopper 14 thereby permitting material to flow from the bag to and through the hopper as used.

A pair of wheels 20 and 21 are mounted on axle 12, at least one of the wheels being non-rotatably secured to the axle 12 to provide a positive drive connection for rotating the axle as the spreader is pushed along the ground. Preferably the other wheel is freely journalled on axle 12 by a bearing to enable differential wheel rotation, a conventional practice.

The hopper 14 is journalled on the axle 12 by a pair of bearings 24 (preferably a sleeve bearing made of corrosion resistant plastic) each of which is mounted in an aperture on an associated side wall 28 of the hopper 14. Side walls 28 are substantially flat, plate-like members made from sheet metal and have a curved elongated shape with a convex front peripheral edge flange 32 joining a concave rear peripheral edge flange 34 by means of a continuous smooth convex curved peripheral edge flange 36 at the bottom of hopper 14. The top edge 38 of each side wall 28 is straight and formed with an outwardly directed terminal roll of the sheet metal material. The three peripheral edge flanges 32, 34 and 36 together constitute a continuous integral assembly joinder flange. The front, bottom and rear walls 41, 42 and 43, respectively, of hopper 14 are preferably formed from a single integral piece of sheet material shaped to conform in fore and aft cross-section to the curvatures of the inside of the continuous side wall flanges. The front, bottom and rear hopper walls are secured to the inside of the flange of the side walls by any suitable means such as welding or sheet metal screws. The top edges of the front and rear hopper walls 41 and 43 are provided with outwardly directed rolled edges 46 and 48 which extend transversely between the side wall terminal rolls 38 to form a rigid top supply opening 50 for the hopper. The shape of the hopper and the top rolled edges result in an extremely rigid hopper structure.

Shown in FIGURES 1 and 2 the handle assembly 16 is formed from three pieces of shaped tubing. The lower half is a single, generally U-shaped piece of tube 52 having lower terminal ends 54 and 56 secured to the two side walls of the hopper by bolt and nut assemblies 60 which pass through the hopper side walls and the lower tubing ends 54 and 56, which may be flattened if desired. This assembly provides a V-shaped upper bight 58 extending up from and rigidly secured relative to the rear hopper wall above the hopper opening. The upper portion of handle assembly 16 is an assembly of two pieces of tubing 62 and 64 having their lower ends flattened, curved in cross-section and divergently bent to provide a snug fit over the V-shaped bight 58. The lower divergent ends are secured to the lower portion 52 by nuts and bolts. Conventional handle grips 66 are located on outwardly bent upper handle bar ends 68 of the two tubing pieces 62 and 64.

The handle assembly 16 includes a device to retain a bag of material in operative position with respect to the hopper 14 regardless of the attitude, cut-off or distribution, in which the hopper is placed. The retainer device is preferably an elastic cord 69 connected at both its ends to the U-shaped lower handle member 52 by suitable hook and eye fixtures 70 to enable convenient engagement and release of the elastic cord. Cord 68 is resiliently stretched to partially encircle a bag, will hold the bag upright against the central part of the handle assembly 16, and will prevent the bag from slipping up or down along the handle. Hopper 14 also includes a discharge and control mechanism shown in FIGURES 1, 2 and 3. Such mechanism includes a transverse row or series of apertures 72 extending in a row from one side of the hopper along the curved bottom portion to the other side. These apertures 72 are accurately made, preferably by punching in the sheet material of curved hopper bottom wall portion 42 and as shown have a progressive increase in width from front to rear.

To selectively close desired areas of the row of punched apertures, a transversely elongate rate control shutter or bar 74, curved to match the curvature of the hopper bottom and with a straight front edge 76 (shown in detail in FIGURE 4) is located positioned laterally across the curved hopper bottom and will cover or uncover the same portion of all of the apertures 72. Rate control bar 74 is shiftable in an arc forward and backward in order to enable variation in the rate of discharge of material from the hopper.

The rate control bar 74 is selectively maintained and retained in position by several components, namely, two L-shaped end brackets 77 and 78 which embrace and guide shaped guide flanges 79 at the ends of control bar 74 and also provide means which enable clamping of the control bar in a set position, as will be more fully described hereinafter.

A further component consists of a rate setting slide member 80 which through a unique hinge connection slidably interlocks with the control bar and provides means for shifting and accurately locating and maintaining parallelism of all positions of rate control bar. The precise shapes and inter-engaging cooperation between the rate control bar 76, end brackets 77 and 78 and the rate setting slide member 80 will be described in specific detail hereinafter.

Discharge mechanism 70 further includes, within the hopper 14, an agitator 82 (FIGURE 2) comprising four generally rectangular flat blades or vanes 84 which are rigidly secured by welding at uniformly spaced circumferential positions around the axle and extend transversely along the axle 12 between the two side walls 28. The agitator 84 is rotated along with the axle 12 by means of the fixed wheel as the spreader is pushed along the ground. The relationship of the shape of the hopper bottom and location of path of rotation relative to the apertures in the hopper bottom to accomplish the attitude cut-off principle of operation has been fully described in the aforedescribed co-pending application to which attention is directed if necessary for an understanding of that principle.

The rate of material discharge is selectively set by manipulation and clamping of two major components, the rate control bar 74 shown separately in FIGURES 4 and 5 and the rate setting slide member 80 shown in FIGURE 6 with details seen in FIGURES 7 and 8. The assembled relationship of the rate control bar 74 and rate setting slide member 80 is shown in FIGURES 2 and 3.

Referring to FIGURES 4 and 5, the rate control bar 74 is made from a long strip of flat sheet metal which is curved to a contour matching the rounded bottom 42 of the hopper. The front of bar 74 is a straight sharp edge 76 which in assembly extends across the discharge openings and accurately determines the through flow size of the entire row of apertures. The ends 79 of the rate control bar 74 are shown in FIGURES 4 and 5 as having an offset step the distance of a thickness of the sheet metal. This step enables the two ends 79 of the bar 74 to rest and ride on the curved flange portions 36 of each hopper side wall 28 at the same time the center extent and leading edge 76 of bar 74 rests against the curved hopper bottom wall. The two end flanges 79 are somewhat longer than the control part of the bar to enable clamping of the bar 74 in all adjusted positions.

Previously described L-shaped clamping brackets are heavy and strong, for example they can be made from heavy gauge cold rolled steel, to provide rigidity and resist bending. One leg of each bracket is secured as by spot welding to the hopper side wall and the other bracket leg 86, which overhangs the rate control bar end flanges 79, contains a threaded aperture into which is screwed a wing or thumb screw 88. When thumb screws 88 are turned down tight, they clamp the ends 79 of the rate control bar 74 firmly against the hopper, and maintain the bar 74 in a selected rate discharge position.

The rear edge of rate control bar 74 is turned up, normal to the main portion, to provide an interlocking straight flange 90 which serves as part of the slidable hinge means providing a direct connection between the rate setting slide 80 and the rate control bar 74.

As clearly illustrated in FIGURE 3, the rate setting slide member 80 is not as long (i.e., its lateral dimension) as is the rate control bar. Obviously it has to be less than the width of the hopper to enable sliding from one side to the other. Turning to FIGURE 6, two parallel diagonal slots 92 and 94 can be seen in the slide member 80, one located in each of the two end portions of the slide member. The angle of slope of the slot is low so that the component of side movement of the slide member will be materially greater than the component of movement which will shift the control bar fore or aft. The ratio of the side component of shift to the fore and aft component of shift in the components as incorporated in a successful model of this invention was approximately 32:5. FIGURES 6, 7 and 8 show a raised embossment around both of the slots located on the side of slide member 80 which faces away from the hopper. The slide is mounted on the rear wall 43 of hopper 14 by virtue of the two slots 92 and 94 fitting over two permanently, accurately located studs, one of which 98 is seen in FIGURE 2, the slide member being retained in position by spring washers (not shown) held on the studs, against the slide embossments 96, by cap-shaped push nuts 100, one of which can be seen in FIGURE 3. The two studs 98 are dimensioned to have a close but sliding fit within the slots 92 and 94 and thereby maintain the accurate parallelism of the horizontal disposition of the slide member in all positions to which it can be slid on the studs.

The slide member 80 rests on a somewhat flat area of the hopper rear wall whereas the rate control plate 74 is positioned on an arcuate portion of the hopper. The two parts, slide member 80 and rate control bar 74 are connected together with a laterally slidable, effectively hinged interlock which assures that the accurately maintained parallel disposition of the slide member 80, regardless of its position on studs 98, will be equally reflected in the disposition of the rate control bar 74. Effectively, the fore and aft component of movement is transmitted from the slide member to the rate control member as if they were integral, yet the lateral component of movement of the slide member is not transmitted to the rate control bar.

To accommodate the desired above discussed coaction, each end of the slide member 80, on the edge which is immediately adjacent the upturned flange 90 of the rate control bar, has a small inverted channel-like hook 102 the free flange 104 of which hooks over the rate bar flange 90 (see FIGURES 2 and 9). The width of the channel hook 102 is greater than the thickness of the rate bar flange 90 to permit a slight amount of hinging movement between the members, however adjacent each channel hook 102, a small bearing pad 106 is provided on the same edge of the slide member 80. Pads 106 as shown in FIGURE 9 cooperate with the channel flange 104 to closely embrace the rate bar flange 90. The fit is actually a close free fit to prevent play of the flange 90 between the channel flange 104 and pad 106 and yet to permit free sliding movement of the slide member back and forth on the rate bar flange. The two conections, at respective ends of the slide member 80, provide positive position location with minimum bearing surface between the slide member 80 and rate control bar 74.

An integral gusset plate 108 behind each channel 102 provides strength as well as a means to grasp the slide member 80 and slide it back and forth for desired adjustment settings.

The rate setting slide member 80 can be molded using a high-impact, rigid plastic having good chemical and wear resistance properties. One such plastic which has been used and found satisfactory is "Cycolac," a styrene type plastic resin. The plastic serves as an effective self lubricated unit particularly where the embossments 96 and pads 106, which contact metal parts, are concerned.

The central planar portion of slide member 80 indicated by the dotted area 110 serves as an area for location of an index scale (see FIGURE 3) which cooperates with a fixed pointer 112. The pointer 112 can be made from "Lucite," has two integral pilot pins 114 which project into corresponding holes in the hopper wall. A screw 115 (FIGURE 3) secures the pointer on the hopper. An index line 116, engraved or embossed into the pointer, cooperates with the index scale area 110 on the slide member 80, the pointer 112 being undercut at 118 (FIGURE 10) so the slide member can pass under the pointer.

A support leg (FIGURES 1 and 2) is provided to enable an upright position of the spreader when in a rest position. The support leg is made from a round rod 120 bent into an L-shaped with the short leg 122 of the L inserted from front to rear through the top rolled edge 38 of hopper side 28. A cotter pin 124 in the end of the short leg 122 secures the leg within the rolled edge 38. The front of rolled edge 38 is notched at 125 to accommodate the bend in rod 120 and permit the support leg to be swung up, over and into the hopper 14 as shown by phantom lines in FIGURE 1. The foot 126 of support rod 120 is formed by a short bend at the end of the rod and small clips 128 and 130 riveted to the hopper walls respectively provide leg detents in the support and stowed locations.

Operation

In the operation of the rate mechanism, with thumb screws 88 loosened, the rate setting slide member 80, which can be slid back and forth between the sides of the hopper, is slid laterally to a desired setting as indicated by the pointer 112 relative to the index scale 110. By virtue of the angled slots 92 and 94 in slide member 80 the component of lateral shift also results in a component of fore and aft shift. The channels 102 on the slide member 80 fit over the rear flange 90 of rate control bar 74 and cause the control bar to shift in the desired direction an amount equal to the fore or aft shift of the slide member. The front edge 76 of rate control bar moves to cover or uncover more area of the row of discharge openings 72. Once the rate setting slide member 80 is at the desired index setting, the rate control bar will be located at the desired rate discharge position and the rate control bar is securely fastened or clamped in that location by tightening the thumbscrews 88. When the rate control bar 74 is so clamped, the rate setting slide member is also secured against further movement by virtue of its connection to the rate control bar.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A material distributing spreader comprising: a wheel supported hopper with confining walls, including a bottom wall extending between its wheels and discharge opening means with a convex curvature from front to rear transversely arranged across said bottom wall; and a discharge rate control mechanism comprising an arcuately shiftable discharge aperture shutter member, a shiftable combination indexing and positioning means and means interconnecting said shutter member and said shiftable means; and means mounting said shiftable means on said spreader hopper for movement substantially in a planar path and enabling components of lateral shift with concurrent components of shift in the direction of arcuate movement of said shutter member directly related to said component of lateral shift while maintaining its parallelism relative to the said transversely arranged discharge opening means in all selected shift positions, said interconnecting means comprising spaced apart slidable hinging means between said shiftable means and said shutter member permitting relative transverse movement and preventing relative movement in the direction of arcuate shift between said shiftable means and said shutter member, and means to releasably maintain both said shutter member and said shiftable means in any selectively shifted position.

2. A spreader as defined in claim 1 wherein said shiftable means is an elongate slide means mounted transversely of and on said hopper immediately adjacent said shutter member.

3. A spreader as defined in claim 2, wherein a rate control indexing means comprises a fixed device on said hopper and a portion of said slide means and enables visual indexed settings of said slide means to accurately determine the arcuate setting of said rate control shutter member.

4. A spreader as defined in claim 2, wherein an index pointer means is fixed on said hopper and includes a reference means immediately adjacent said slide means, and a portion of said slide means which is shiftable past said reference means includes a plurality of index marks bearing a direct ratio to the associated discharge rate setting of said rate control shutter member relative to said discharge opening means.

5. A spreader as defined in claim 2, wherein said slide means is made from a high strength plastic material having effective self-lubricating characteristics.

6. A spreader as defined in claim 1, wherein an axle shaft connects said wheels and extends through the interior of the hopper across said hopper bottom wall, agitator vanes fixed on said shaft, said discharge opening means consists of a transverse row of openings each of which is divergent facing toward the rear of the hopper, and said rate control shutter member is arcuately shifted toward the front of said hopper as the free flow portions of said openings are made smaller.

7. A material distributing spreader comprising: a wheel supported hopper with confining walls, including a bottom wall extending between its wheels and discharge opening means with a convex curvature from front to rear transversely arranged across said bottom wall; and a discharge rate control mechanism comprising an arcuately shiftable discharge aperture shutter member, a shiftable combination indexing and positioning means and means mounting said shiftable means on said spreader enabling components of lateral shift with concurrent components of shift in the direction of arcuate movement of said shutter member directly related to said components of lateral shift while maintaining its parallelism relative to said discharge opening means in all selected shift positions, spaced apart means connecting said shiftable means to said shutter member permitting relative transverse movement and preventing relative movement in the direction of arcuate shift between said shiftable means and said shutter member; and clamping means, to releasably maintain both said shutter member and said shiftable means in any selectively shifted position, comprising a plurality of bracket means, one secured on said hopper adjacent each end of said bottom wall so that a part of each bracket means is adjacent the associated ends of said rate control shutter member throughout the extent of its adjusted position, and a releasable clamp unit is mounted on each said bracket means and is adapted to fasten the associated end of said shutter member securely to an adjacent portion of said hopper and through said shutter member to rigidly fix said shiftable indexing and positioning means.

8. A spreader as defined in claim 7, wherein each said bracket means is an L-shaped bracket rigidly secured to said hopper with a part underhanging an associated end of said shutter member, and said releasable clamp unit is a thumb screw threaded through said bracket part and adapted to engage and clamp the associated end of said shutter member against said hopper bottom.

9. A material distributing spreader, comprising: a wheel supported hopper with confining walls, including a bottom wall extending between its wheels and discharge opening means with a convex curvature from front to rear transversely arranged across said bottom wall; and a discharge rate control mechanism comprising an arcuately shiftable discharge aperture shutter member, a shiftable combination indexing and positioning means and means mounting said shiftable means on said spreader enabling components of lateral shift with concurrent components of shift in the direction of arcuate movement of said shutter member directly related to said components of lateral shift while maintaining its parallelism relative to said discharge opening means in all selected shift positions: said shutter member having a rear edge flange projecting substantially normal to the hopper bottom wall; spaced apart means connecting said shiftable means to said shutter member, permitting relative transverse movement and preventing relative movement in the direction of arcuate shift between said shiftable means and said shutter member, comprising at least two independent connector means at widely spaced positions on said shiftable means which respectively engage said shutter member adjacent its opposite ends, each said connector means comprising an inverted channel piece of small width located on said shiftable means and disposed over said flange and a bearing pad located on said shiftable means adjacent each channel piece whereby in assembly said flange is accurately confined between said bearing pads and one side of said channel piece with negligible freedom of movement of said flange relative to said connector means normal to said flange and with an accurate, close and smooth sliding fit between said connector means and said flange in a direction parallel with said flange; and means to releasably maintain both said shutter member and said shiftable means in any selectively shifted position.

10. A material distributing spreader comprising: a wheel supported hopper with confining walls including a bottom wall extending between its wheels and discharge opening means with a convex curvature from front to rear transversely arranged across said bottom wall; and a discharge rate control mechanism comprising an arcuately shiftable discharge aperture shutter member, a shiftable combination indexing and positioning means and means mounting said shiftable means on said spreader enabling components of lateral shift with concurrent components of shift in the direction of arcuate movement of said shutter member directly related to said components of lateral shift while maintaining its parallelism relative to said discharge opening means in all selected shift positions, spaced apart means connecting said shiftable means to said shutter member permitting relative transverse movement and preventing relative movement in the direction of arcuate shift between said shiftable means and said shutter member; said shiftable means constituting an elongate flat bar having at least two parallel through slots disposed diagonally across its width and with at least one said slot near each end portion; two studs fixed in the wall of said hopper spaced apart a distance equal to the transverse spacing between similar parts of said at least two slots; and securing means structurally coperating with said studs maintain said shiftable means on said hopper with its said slots disposed over said studs with said shiftable means capable of sliding action as controlled by cooperation between said slots and said studs; and means releasably maintaining both said shutter member and said shiftable means in any selectively shifted position.

11. A material distributing spreader comprising: a wheel supported hopper with confining walls including a bottom wall extending between its wheels, the rear wall of said hopper being concave, the front wall being convex and the bottom wall being convex passing into a transition at the area between the bottom wall and rear wall, and discharge opening means in the convex curvature of the bottom wall extending transversely across said bottom and closely adjacent said transition area enabling an arcuate shift of said hopper about the wheel axis between one position wherein said discharge opening means is directed downward and another position wherein said discharge opening means is directed upwardly and located higher than said transition area relative to ground level thereby enabling an attitude cut-off operation of material discharge; and a discharge rate control mechanism comprising an arcuately shiftable discharge aperture shutter member, a shiftable combination indexing and positioning means and means mounting said shiftable means on said spreader enabling components of lateral shift with concurrent components of shift in the direction of arcuate movement of said shutter member directly related to said components of lateral shift while maintaining its parallelism relative to said discharge opening means in all selected shift positions, spaced apart means connecting said shiftable means to said shutter member permitting relative transverse movement and preventing relative movement in the direction of arcuate shift between said shiftable means and said shutter member, and means to releasably maintain both said shutter member and said shiftable means in any selectively shifted position.

12. A material distributing spreader comprising: a wheel supported hopper with confining walls including a bottom wall extending between its wheels, the rear wall of said hopper being concave, the front wall being convex and the bottom wall being convex passing into a transition at the area between the bottom wall and rear wall, and discharge opening means in the convex curvature of the bottom wall extending transversely across said bottom and closely adjacent said transition area enabling an arcuate shift of said hopper about the wheel axis between one position wherein said discharge opening means is directed downward and another position wherein said discharge opening means is directed upwardly and located higher than said transition area relative to ground level thereby enabling an attitude cut-off operation of material discharge; a discharge rate control member adapted to be arcuately shifted fore and aft adjacent said bottom wall portion to position which selectively variably cover said discharge opening means to thereby enable a selective variation in material discharge rate from the hopper out through said discharge opening means; releasable clamping means mounted on said hopper adapted to releasably engage, clamp and maintain said rate control member in selectively set positions; a rate setting slide means; mounting means securing said slide means on a wall of said hopper and enabling sliding movement of said slide means, said sliding movement providing a component of movement transverse of the hopper and a component of movement in the direction of arcuate shift of said rate control member; and a direct connection between said slide means and said rate control member enabling a positive direct transfer from said slide means to rate control member of the component of slide movement in the direction of arcuate shift of said rate control member and permitting freedom for transverse relative shift between said slide means and said rate control member.

13. A material distributing spreader comprising: a wheel supported hopper with confining walls, including a bottom wall extending between its wheels and discharge opening means with a convex curvature from front to rear transversely arranged across said bottom wall; and a discharge rate control mechanism comprising an arcuately shiftable discharge aperture shutter member, a shiftable combination indexing and positioning means and means mounting said shiftable means on said spreader hopper enabling components of lateral shift with concurrent components of shift in the direction of arcuate movement of said shutter member directly related to said components of lateral shift while maintaining its parallelism relative to said transversely arranged discharge opening means in all selected shift positions, spaced apart means connecting said shiftable means to said shutter member permitting relative transverse movement and preventing relative movement in the direction of arcuate shift between said shiftable means and said shutter member, and means to releasably maintain both said shutter member and said shiftable means in any selectively shifted position; said shiftable means being an elongate slide means mounted transversely of and on said hopper immediately adjacent said shutter member, and said spaced apart means which connects said shiftable means to said rate control shutter member comprise at least two independent connector means at widely spaced positions on said slide means which respectively engage said shutter member adjacent its opposite ends, each said connector means embracing said shutter member with an accurate close fit enabling freedom for lateral relative sliding action.

14. A material distributing spreader comprising: a wheel supported hopper with confining walls, including a bottom wall extending between its wheels and discharge opening means with a convex curvature from front to rear transversely arranged across said bottom wall; a discharge rate control member adapted to be arcuately shifted fore and aft adjacent said bottom wall portion to positions which selectively variably cover said discharge opening means to thereby enable a selective variation in material discharge rate from the hopper out through said discharge opening means; releasable clamping means mounted on said hopper adapted to releasably engage, clamp and maintain said rate control member in selectively set positions; a rate setting slide unit; mounting means securing said slide unit closely adjacent a wall of said hopper and enabling sliding movement of said slide unit substantially in a planar path, said sliding movement providing a component of movement transverse of the hopper and a component of movement in the direction of arcuate shift of said rate control member; and connection means providing a direct hinging connection between said slide unit and said rate control member enabling a positive direct transfer from said slide means to said rate control member of the component of slide movement in both directions of arcuate shift of said rate control member and permitting freedom for transverse relative shift between said slide unit and said rate control member.

References Cited
UNITED STATES PATENTS 2,828,051    3/1958    Puydt et al. _____ 222—485 X

FOREIGN PATENTS 9,044    11/1906    Denmark.
1,169,464    12/1958    France.

ROBERT B. REEVES, *Primary Examiner.*

HADD S. LANE, WALTER SOBIN, *Examiners.*